US007888762B2

(12) United States Patent
Abe

(10) Patent No.: US 7,888,762 B2
(45) Date of Patent: Feb. 15, 2011

(54) INFRARED DETECTOR AND FABRICATING METHOD OF INFRARED DETECTOR

(75) Inventor: Kazuhide Abe, Tokyo (JP)

(73) Assignee: Oki Semiconductor Co., Ltd., Tokyo (JP)

(*) Notice: Subject to any disclaimer, the term of this patent is extended or adjusted under 35 U.S.C. 154(b) by 119 days.

(21) Appl. No.: 12/314,955

(22) Filed: Dec. 19, 2008

(65) Prior Publication Data
US 2009/0184246 A1 Jul. 23, 2009

(30) Foreign Application Priority Data
Jan. 22, 2008 (JP) ............................. 2008-011802

(51) Int. Cl.
*H01L 31/058* (2006.01)
(52) U.S. Cl. ............... 257/459; 257/467; 257/E31.043; 257/E31.124
(58) Field of Classification Search ................. 257/459, 257/467, E31.043, E31.124
See application file for complete search history.

(56) References Cited

U.S. PATENT DOCUMENTS

| | | | | |
|---|---|---|---|---|
| 5,374,123 A | * | 12/1994 | Bu | 374/109 |
| 6,013,935 A | * | 1/2000 | Shie | 257/469 |
| 6,163,061 A | * | 12/2000 | Iida | 257/467 |
| 6,548,879 B2 | * | 4/2003 | Komobuchi et al. | 257/431 |
| 6,617,659 B2 | * | 9/2003 | Komobuchi et al. | 257/431 |
| 6,777,680 B2 | * | 8/2004 | Morita et al. | 250/338.1 |
| 6,870,086 B2 | * | 3/2005 | Hamamoto et al. | 136/225 |
| 7,276,770 B1 | * | 10/2007 | Goushcha et al. | 257/431 |
| 7,635,605 B2 | * | 12/2009 | Shibayama | 438/53 |
| 7,687,774 B2 | * | 3/2010 | Ohta et al. | 250/338.1 |
| 2002/0185169 A1 | * | 12/2002 | Hamamoto et al. | 136/224 |
| 2003/0205670 A1 | * | 11/2003 | Shibayama | 250/338.4 |
| 2007/0114416 A1 | * | 5/2007 | Ohta et al. | 250/338.4 |

FOREIGN PATENT DOCUMENTS

| | | | |
|---|---|---|---|
| JP | 04132272 A | * | 5/1992 |
| JP | 11-258039 | | 9/1999 |
| JP | 2007-178323 | | 7/2007 |
| JP | 2007-187495 | | 7/2007 |

OTHER PUBLICATIONS

Oda et al., "Development of Uncooled Thermopile-type Infrared Detectors", Journal of The Japan Society of Infrared Science and Technologies, vol. 14, No. 2, pp. 44-47, 2005, Discussed on p. 2 of the present application.

* cited by examiner

*Primary Examiner*—Allan R Wilson
(74) *Attorney, Agent, or Firm*—Rabin & Berdo, PC

(57) ABSTRACT

There is provided an infrared detector including: a silicon substrate provided with a concave portion; an infrared receiver having a polysilicon layer; and a beam that supports the infrared receiver above the concave portion, and extends along a side of the infrared receiver from the infrared receiver to connect with the silicon substrate, the beam having at least two bent portions, wherein at least one of the bent portions of the beam is disposed at a position on a side opposite to the concave portion with the polysilicon layer as a reference point.

13 Claims, 16 Drawing Sheets

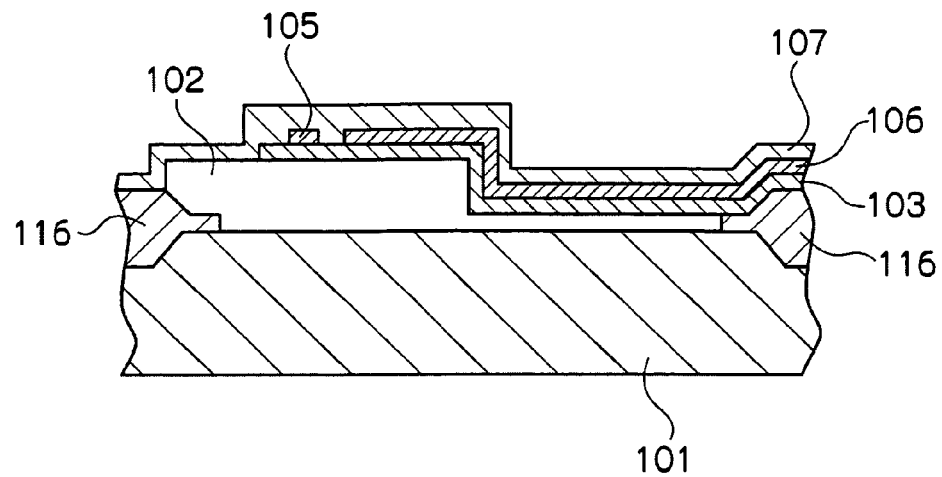
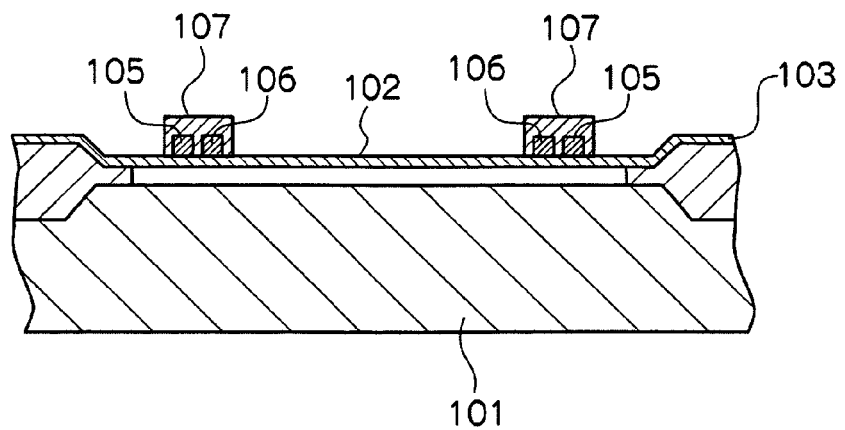

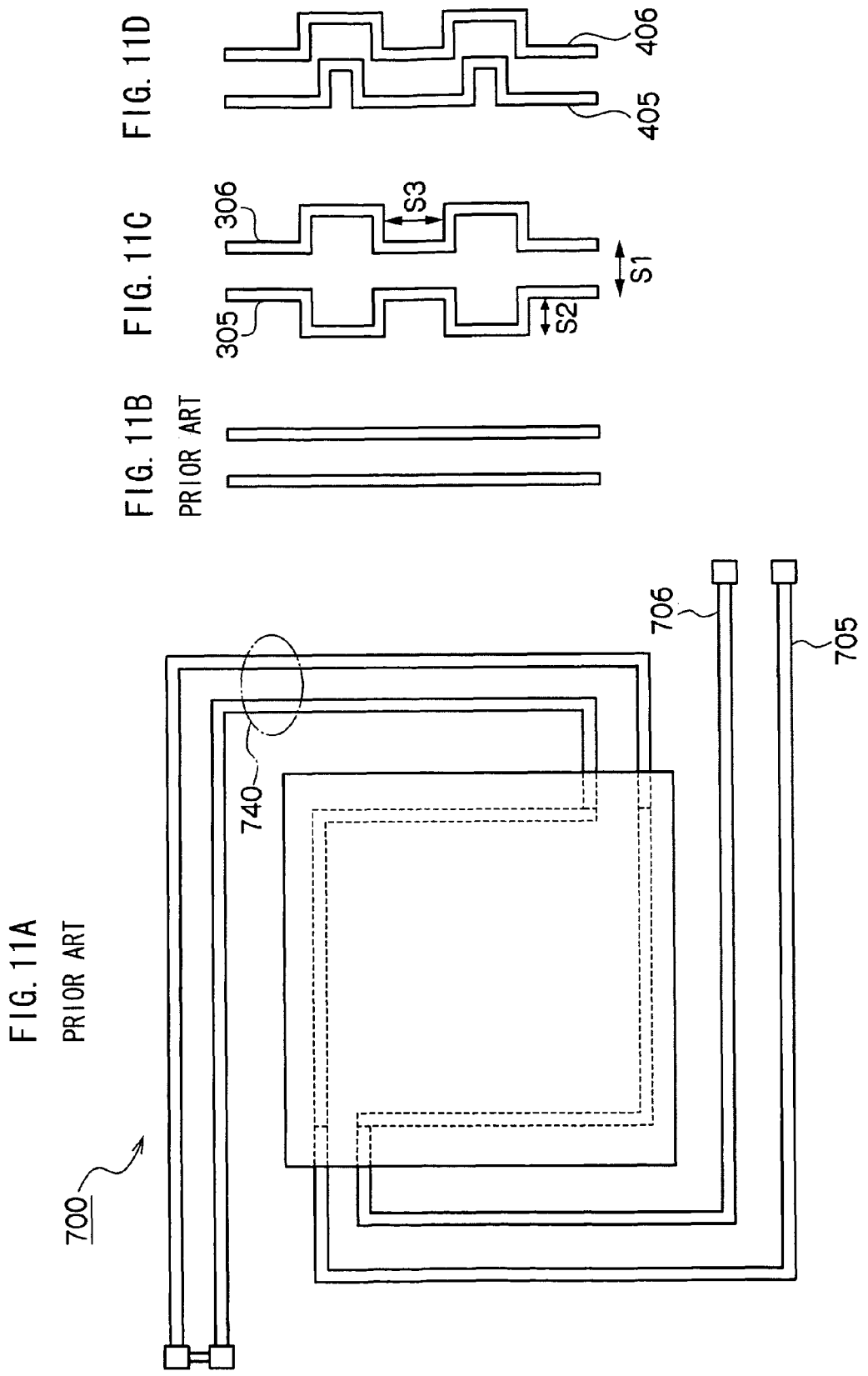

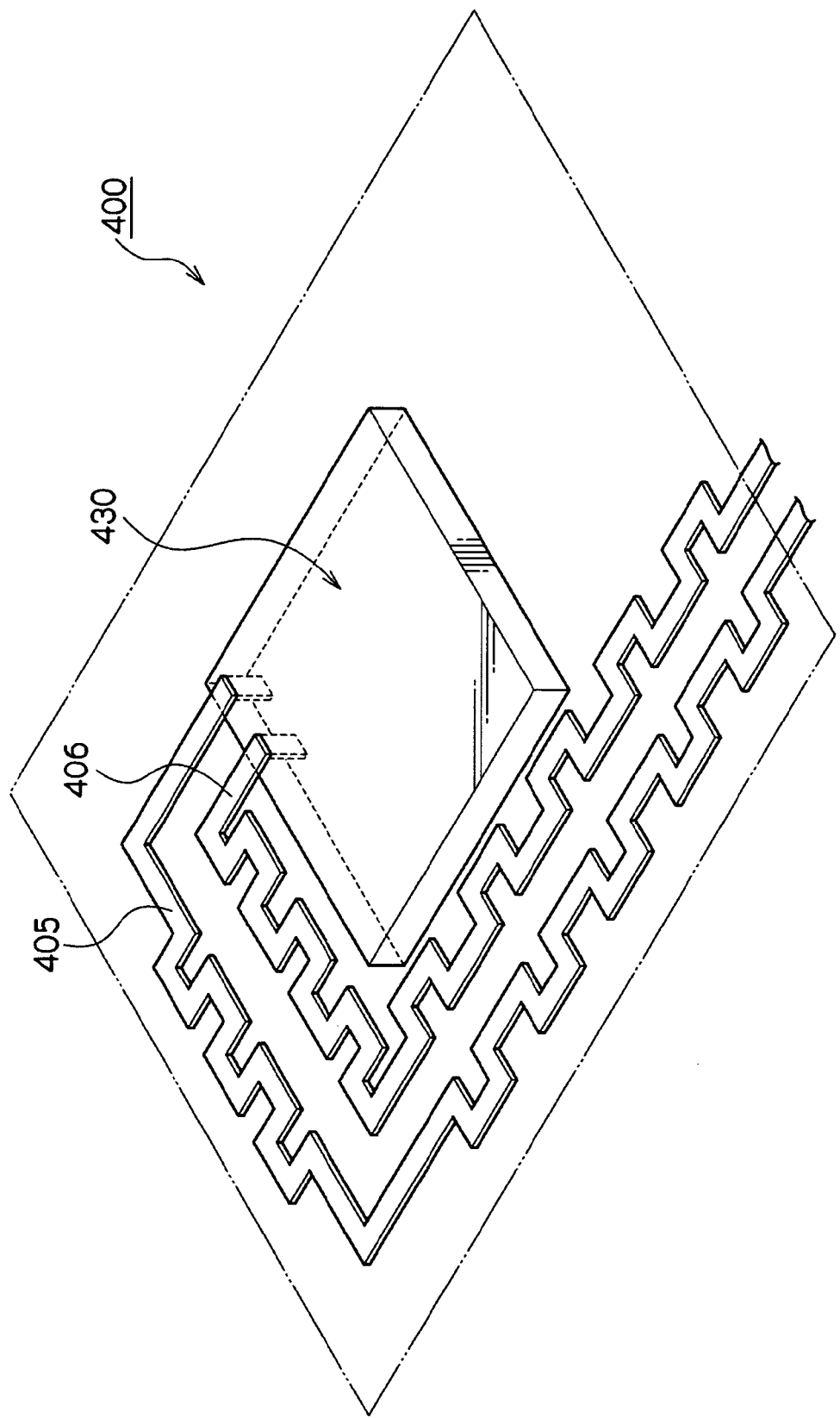

INFRARED DETECTOR AND FABRICATING METHOD OF INFRARED DETECTOR

CROSS-REFERENCE TO RELATED APPLICATION

This application claims priority under 35 USC 119 from Japanese Patent Application No. 2008-011802, the disclosure of which is incorporated by reference herein.

BACKGROUND OF THE INVENTION

1. Field of the Invention

The present invention relates to an infrared detector and a fabricating method thereof, in particular, an infrared detector that detects a temperature of an infrared receiver with a thermopile and a fabricating method of the infrared detector.

2. Description of the Related Art

Infrared ray is a collective term for an electromagnetic wave having a wavelength substantially from 0.72 to 1000 μm. It is categorized largely into a short wavelength band (3 to 5 μm) and a long wavelength band (8 to 14 μm). An infrared sensor is divided, from the viewpoint of the operation principle, into a quantum type and a thermal type. The quantum type makes use of series excitation of sensor elements due to photons of infrared ray. Changes of resistance and voltage of the sensor element generated by the series excitation are read (photovoltaic type, photoconductive type). The quantum type uses a Narrow gap semiconductor; accordingly, noise caused by thermal fluctuation of electrons has to be suppressed. Furthermore, it necessitates cooling to a liquid nitrogen temperature; accordingly, there is a disadvantage in that a sensor becomes large.

On the other hand, the thermal type converts incident infrared energy into thermal energy to finally read as an electric signal. Accordingly, the thermal type does not necessitate cooling, as a noise countermeasure, to a liquid nitrogen temperature level and is called a non-cooling type. From the viewpoint of miniaturization, lighter weight and lower cost, the non-cooling type is advantageous in comparison with the cooling type. Furthermore, although the quantum type is advantageous in being excellent in the sensor performance (for instance, the detection resolution of temperature (NETD) is <0.1K for the non-cooling type and <0.03K for the cooling type, and the response speed is <10 msec for the non-cooling type and <1 μsec for the cooling type), the non-cooling type as well has been forwarded in the development and an improvement in the performance is remarkable. In order to popularize widely, the magnitude and cost are very important items; accordingly, a camera that mounts a non-cooling type infrared sensor is advantageous. The non-cooling type is applied in surveillance cameras for security and disaster prevention, thermography for nondestructive use and car cameras for securing safe driving during night.

In the thermal type sensors, a PN junction type, a borometer type, a pyroelectric type and a thermo-electromotive (thermopile) type are cited. The thermopile type is constituted of an infrared receiver (infrared ray absorption to heat transformation), a thermopile combining a beam (temperature detection of the receiver) and a reading circuit. For example, see following document:

Document 1: Development of Thermopile type Non-cooling Infrared Detector", Journal of The Japan Society of Infrared Science and Technologies, Vol. 14(2), p. 44 to 47 (2005).

The thermopile combines a beam and is designed slender and thin.

On the other hand, a device where, in order to lengthen a beam with a magnitude of the device itself maintained constant, a cross sectional shape of the beam is formed in arch is proposed (see such as JP-A No. 11-258039). Furthermore, a device where, in order to cope with torsional stress in an in-plane direction generated in the beam, a projection is disposed at a predetermined position of the beam is proposed (see such as JP-A No. 2007-187495).

However, a slender, long and thin beam like the infrared detector described in the Document 1 and JP-A No. 11-258039, when an infrared receiver or a hollow structure to a beam per se is formed to improve the thermal resolution property, released stress tends to cause more strain. For instance, like FIG. 17B that is an A-A' sectional diagram of FIG. 17A, a hollow structure 704 is a triangular convex 702 exposed on a (111) plane with a (100) plane of a silicon crystal that forms a silicon substrate 701 as a surface. When beams 705 and 706 are strained, as shown in FIG. 18B, the strained beam might come into contact with a substrate. When the beam comes into contact with the substrate, heat is dissipated from a contact portion 716; accordingly, there is a problem in that an effective length of the beam becomes shorter to deteriorate the detection accuracy.

Furthermore, in JP-A No. 2007-187495, to the torsional stress generated in an in-plane direction, while a contact with the substrate of the beam portion is improved from a line contact with the substrate to a point contact, an amount of heat generated at the infrared receiver is slight; accordingly, even the point contact, upon coming into contact with the substrate, dissipates heat to make the beam length shorter. Still furthermore, the contact with the concave portion of the silicon substrate is not improved.

SUMMARY OF THE INVENTION

The invention was carried out in view of the problems and intends to achieve following purposes.

That is, the invention intends to provide an infrared detector capable of avoiding coming into contact with a concave portion of a substrate even when a beam is bent and a fabricating method of the infrared detector.

The present inventors found, after studying hard, that the problems are overcome by use of an infrared detector shown below and a fabricating method of the infrared detector, and thereby, the purposes are achieved.

According to the first aspect of the present invention, there is provided an infrared detector including:
- a silicon substrate provided with a concave portion;
- an infrared receiver having a polysilicon layer; and
- a beam that supports the infrared receiver above the concave portion, and extends along a side of the infrared receiver from the infrared receiver to connect with the silicon substrate, the beam having at least two bent portions,
- wherein at least one of the bent portions of the beam is disposed at a position on a side opposite to the concave portion with the polysilicon layer as a reference point.

According to an infrared detector of the first aspect of the invention, a bent portion most large in the strain amount when the beam is bent, with a wiring of the lowermost layer of an infrared receiver as a reference, is disposed so as to project toward a side opposite to the concave portion of a silicon substrate. Accordingly, even when the beam is bent, the bent portion of the beam does not come into contact with the concave portion of the silicon substrate; as the result, the heat loss from the beam to the substrate is restricted to inhibit the detection accuracy from deteriorating.

According to the second aspect of the present invention, at least one of the bent portions may be provided with a convex shape in a top view.

According to an infrared detector of the second aspect of the invention, in addition to advantages of the first aspect of the invention, a convex portion in a top view changes a direction of stress applied to the beam to be able to restrict a strain amount of the beam per se. Accordingly, the beam and the concave portion of the silicon substrate are more restrained from coming into contact, and the heat loss from the beam to the substrate is restrained to be able to inhibit the detection accuracy from deteriorating.

According to the third aspect of the present invention, at least one of the bent portions may be provided with an aperture.

According to an infrared detector of the third aspect of the invention, in addition to the advantages of the second aspect of the invention, the stress applied to the beam is alleviated at an aperture; accordingly, the strain amount of the beam per se may be further restrained. Accordingly, the heat loss from the beam to the substrate is restrained to be able to inhibit the detection accuracy from deteriorating.

According to the fourth aspect of the present invention, there is provided a fabricating method of an infrared detector, the method including:

forming a first polysilicon layer having a step on a silicon substrate;

forming an insulating film on the first polysilicon layer;

forming a second polysilicon layer on the insulating film;

patterning the second polysilicon layer to form a temperature sensor;

forming a beam having at least two bent portions; and anisotropically etching the polysilicon layer provided with a step and the silicon substrate.

According to a fabricating method of the fourth aspect of the invention of an infrared detector, the infrared detector of the first exemplary embodiment of the invention is fabricated.

According to the fifth aspect of the present invention, the fabricating method of an infrared detector of the fourth aspect, may further including: forming a convex shape in a top view at least one of the bent portions.

According to a fabricating method of the fifth aspect of the invention of an infrared detector, the infrared detector of the second exemplary embodiment, in which the strain amount of the beam is restrained, is fabricated.

According to the sixth aspect of the present invention, the fabricating method of an infrared detector of the fourth aspect may further including: forming an aperture at least one of the bent portions.

According to a fabricating method of the sixth aspect of the invention of an infrared detector, the infrared detector of the third exemplary embodiment, in which the strain amount of the beam is further restrained, is fabricated.

According to the seventh aspect of the present invention, in the fabricating method of an infrared detector of one of the fourth to sixth aspects of the invention, a surface of the silicon substrate may a (100) plane, and in the anisotropic etching of the silicon substrate, the anisotropic etching may be applied so as to expose a (111) plane of the silicon substrate.

According to a fabricating method of the seventh aspect of the invention of an infrared detector, for instance, when wet etching is carried out to apply anisotropic etching to a silicon substrate, an etching speed in a (111) plane is slower than that of a (100) plane. Accordingly, when a plane orientation of the substrate is a (100) plane, at a definite angle from a surface of the substrate, a sidewall is formed.

According to the invention, an infrared detector capable of avoiding coming into contact with a concave portion of a substrate even when a beam is bent and a fabricating method of the infrared detector are provided.

BRIEF DESCRIPTION OF THE DRAWINGS

Preferred exemplary embodiments of the present invention will be described in detail based on the following figures, wherein:

FIG. 8A is a sectional view at C-C' in FIG. 1 illustrating a step of fabricating an infrared detector in a first exemplary embodiment of the invention;

FIG. 8B is a sectional view at A-A' in FIG. 1 illustrating a step of fabricating an infrared detector in a first exemplary embodiment of the invention;

FIG. 11A is a schematic top view of a conventional infrared detector;

FIG. 11B is a partial schematic top view of a conventional infrared detector;

FIG. 11C is a partial schematic top view of an infrared detector in a third exemplary embodiment of the invention;

FIG. 11D is a partial schematic top view of a modified example of an infrared detector in a third exemplary embodiment of the invention;

FIG. 13 is a schematic perspective view of an infrared detector in a fourth exemplary embodiment of the invention;

DETAILED DESCRIPTION OF THE INVENTION

Figure 1:
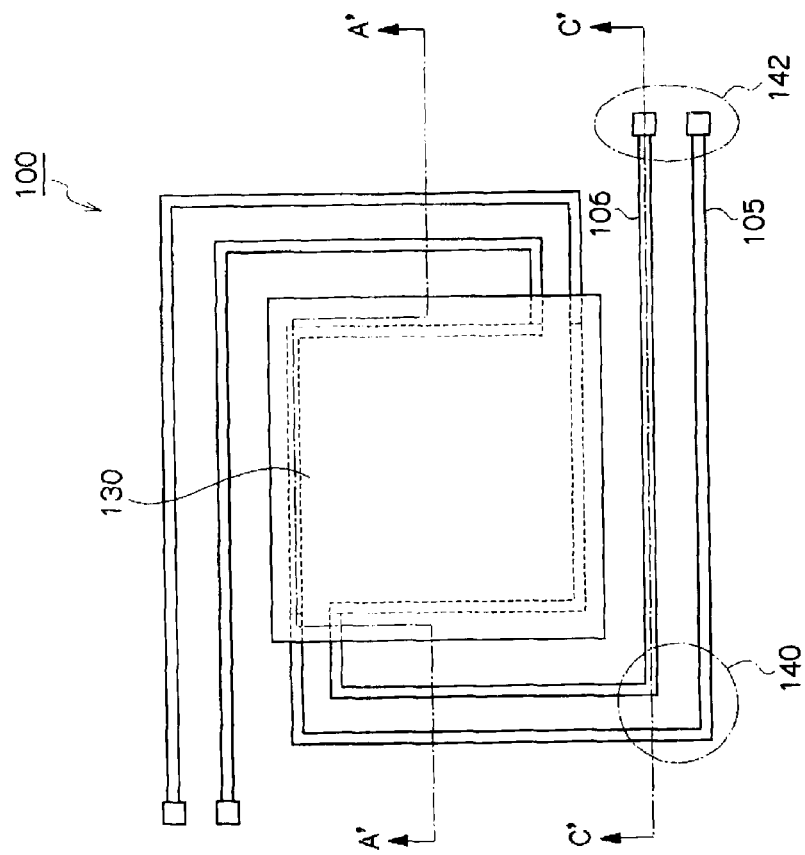
FIG. 1 is a schematic top view of an infrared detector in a first exemplary embodiment of the invention.

In what follows, exemplary embodiments of the invention will be described with reference to the drawings. In the drawings, shapes, magnitudes and positional relationships of the respective constitutional portions are schematically shown only to an extent that allows understanding the invention, that is, the invention is not restricted particularly thereto.

First Exemplary Embodiment

[Infrared Detector]

Figure 2A:
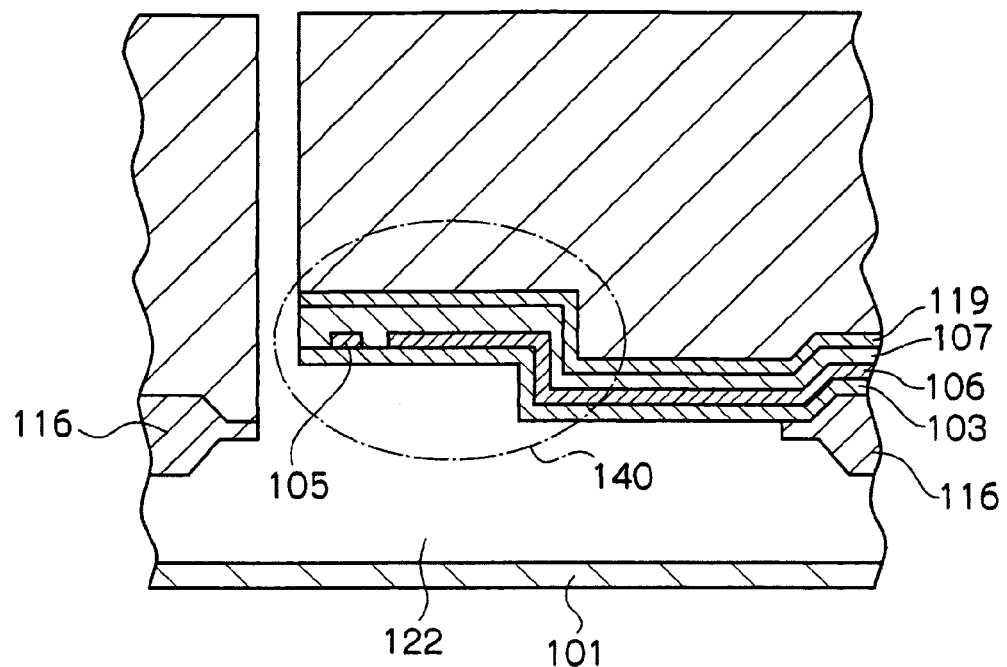
FIG. 2A is a C-C' sectional view of an infrared detector in a first exemplary embodiment of the invention.
Figure 2B:
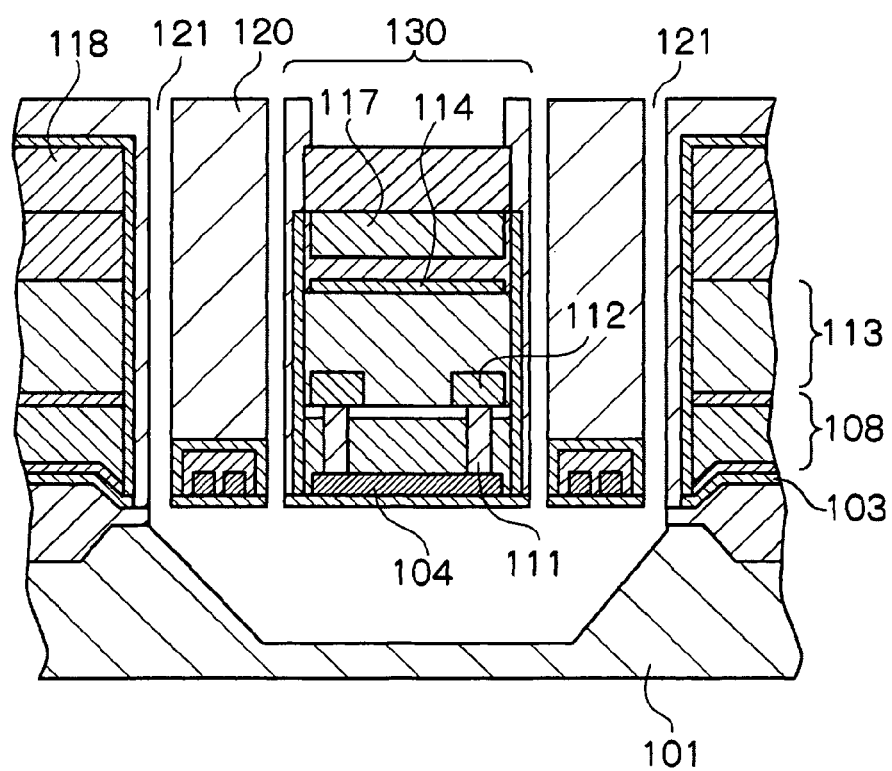
FIG. 2B is an A-A' sectional view of an infrared detector in a first exemplary embodiment of the invention.

FIG. 1 is a schematic top view of an infrared detector in a first exemplary embodiment of the invention. FIG. 2A is a C-C' sectional view of FIG. 1 of an infrared detector in the first exemplary embodiment of the invention. FIG. 2B is an A-A' sectional view in FIG. 1 of the infrared detector of the first exemplary embodiment of the invention.

In an infrared detector 100 in the first exemplary embodiment of the invention, a concave portion is formed in a silicon substrate 101 to dispose a void 122. The void 122 is formed by wet etching the silicon substrate 101, and, as shown in FIG. 2B, a sectional shape thereof is, for instance, a trapezoid and, since a (100) plane is etched, an inclined plane becomes a (111) plane. Above the void 122, an infrared receiver 130 is located and the infrared receiver 130 is supported by a beam located above the concave portion and connected to the infrared receiver 130 and a sidewall portion of the silicon substrate 101. A phosphorus-doped silicon oxide film 120 is deposited so as to cover beams 105 and 106.

The beams 105 and 106 respectively have a bent portion (a portion that bends and is located in an upper portion) 140. The bent portion 140 is, as shown in FIG. 2A, located at a side opposite to the silicon substrate 101 with a beam extruded from the infrared receiver 130 as a reference. That is, the bent portion 140 is located in an upper portion than a portion of the beam extruded from the infrared receiver 130.

An infrared detector in a first exemplary embodiment of the invention is characterized in that, in FIG. 1, at least the bent portion 140 is disposed at a position on a side opposite to the void 122 (concave portion of the silicon substrate) with a polysilicon layer 104 in the infrared receiver 130 shown in FIG. 2B as a reference. Specifically, with a plane on a side of a contact plug 111 of the polysilicon layer 104 as a reference, a plane on a side of a silicon substrate 101 of the bent portion 140 is located on a side opposite to the silicon substrate 101.

Figure 18A:
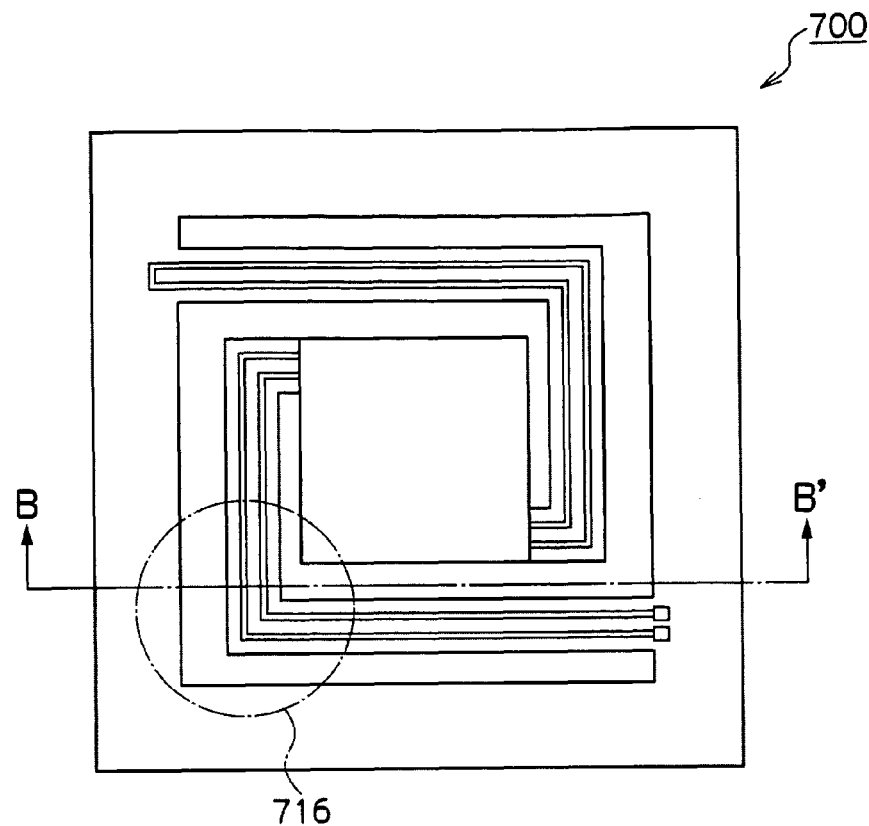
FIG. 18A is a top view in a conventional infrared detector.
Figure 18B:
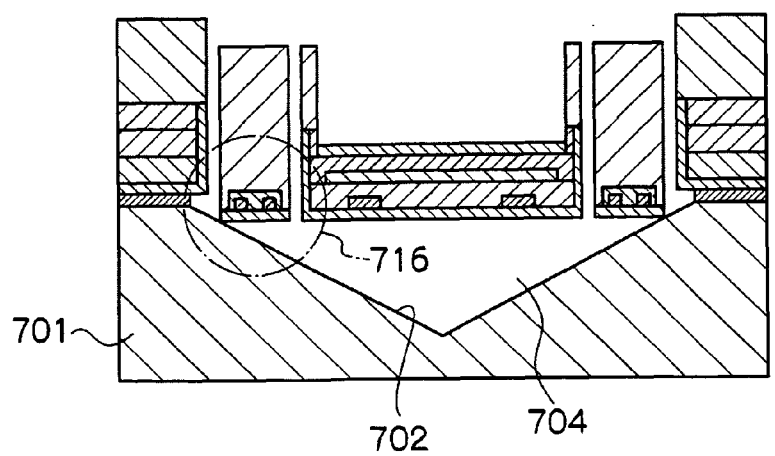
FIG. 18B is a sectional view in a conventional infrared detector.

A reason why a term of "at least a bent portion" is used herein is because, when the beam 105 or 106 of FIG. 1 is bent owing to self-weight or stress, a portion where the strain amount is largest is the bent portion 140. Furthermore, a reason why the polysilicon 104 is taken as a reference is because a beam is connected with a wiring 112 of FIG. 2B. The wiring 112 is lowered to a height of the polysilicon layer 104 in the vicinity where the wiring 112 comes into contact with the beam in the infrared receiver 130 and at the lowered position the beam and the wiring 112 are connected. Accordingly, a beam of a conventional infrared detector is extracted from a height same as that of the polysilicon layer 104 of the infrared receiver 130. From what is mentioned above, the infrared detector 100 of the invention has a structure where, with a height of the polysilicon layer 104 that is a height where a conventional beam is located as a reference, a bent portion 140 is located on a side opposite to the silicon substrate 101. When the structure is adopted, even when the beam is bent same as before, as shown in FIG. 18B, the beam does not come into contact with an inclined portion 702 that is a (111) plane of the silicon substrate 701 below the beam.

In other words, the infrared detector 100 of the invention is characterized in that, as shown in FIG. 2A, at least the bent portion 140 of the beam is disposed so as to project by an amount larger than a strain amount of the beam in a direction departing from the silicon substrate 101.

Figure 3:
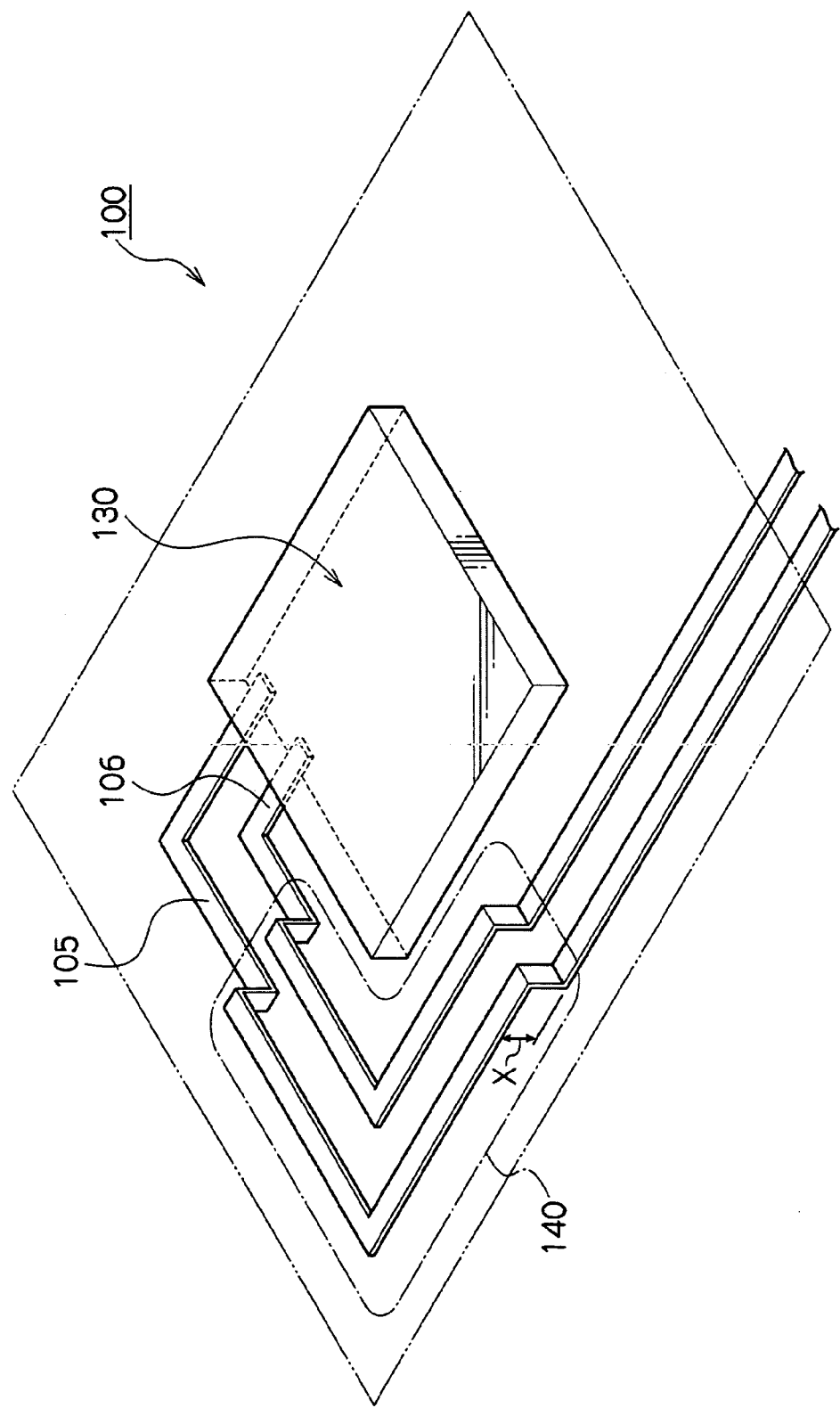
FIG. 3 is a schematic perspective view of an infrared detector in a first exemplary embodiment of the invention.

FIG. 3 is a schematic perspective view of the infrared detector 100 shown in FIG. 1. As shown in the drawing, in the infrared detector 100, the bent portion 140 that is most likely to be bent is disposed at a side opposite to the silicon substrate 101 with the beam extracted from the infrared receiver 130 as a reference.

The bent portion 140 is located at a place that projects on a side opposite to the silicon substrate 101 by X that does not come into contact with the silicon substrate 101 even at the strain amount obtained by specifically assuming a strain amount of the beam. Accordingly, when the infrared detector is used under a very bad environment, by making the projection amount X larger by assuming a strain amount corresponding thereto, the bent portion 140 does not come into contact with the substrate 101.

A silicon substrate, void, beam and infrared receiver that are constituent portions of the infrared detector of the invention will be detailed.

[Silicon Substrate, Void]

In the present invention, the main surface of the silicon substrate 101 is a (100) plane. In the wet etching, the etching speed is different between a (100) plane and a (111) plane of silicon. Accordingly, as shown in FIG. 2B, a void 122 of which inclined surface is a (111) plane is formed. As a method of forming a void, since a chemical used in the wet etching is cheaper than a gas used in the dry etching, it is preferable to use the wet etching to form a void.

[Beam]

A beam in the invention has a structure that combines a thermopile. A sectional structure of the beam is shown in FIG. 2A. According to the structure, an N-polysilicon layer 105 and a P-polysilicon layer 106 are covered with insulating films 103 and 119 made of a silicon nitride film (SiN) and an insulating film made of a silicon oxide film ($SiO_2$) 107.

Furthermore, in order to inhibit the heat conduction loss through a thermopile of an infrared receiver from occurring, the heat resistance of the thermopile that works as the beam as well has to be increased. Accordingly, in order to make the thermopile as the beam more slender, thinner and longer to increase the heat resistance, the thermopile extracted from the infrared receiver 130 is disposed long along a side of the infrared receiver 130. As the results, since the infrared detector 100 of the invention, as shown in FIG. 2A, has a step disposed to a bent portion 130 of the beam, a length of the beam is increased in comparison with a beam that does not have a step, resulting in preferably increasing the heat resistance.

[Infrared Receiver]

The infrared receiver 130 of the invention, as shown in FIG. 2B, has a wiring 112 disposed above a polysilicon layer 104 through a contact plug 111. The wiring 112 is disposed to connect with the beam (thermopile). In a peripheral circuit outside of a sensor, the wiring 112 forms a laminated structure through a through-hole (not shown in the drawing). Examples of materials of the wiring include Al, Cu and alloys containing these.

Furthermore, in a lower layer portion of the infrared receiver 130, a polysilicon layer 104 is formed. The polysilicon layer 104, as will be described below, is formed simultaneously with polysilicon in the beam. Accordingly, a height by which the beam is extracted from the infrared receiver 130 is same as the height of the polysilicon layer 104.

Like a preferable exemplary embodiment described below, a position from where the beam is extracted from the infrared receiver may be a position from where the beam is extracted higher by a strain amount of the beam than a position from where a conventional beam is extracted. The exemplary embodiment will be described below.

Second Exemplary Embodiment

Figure 4:
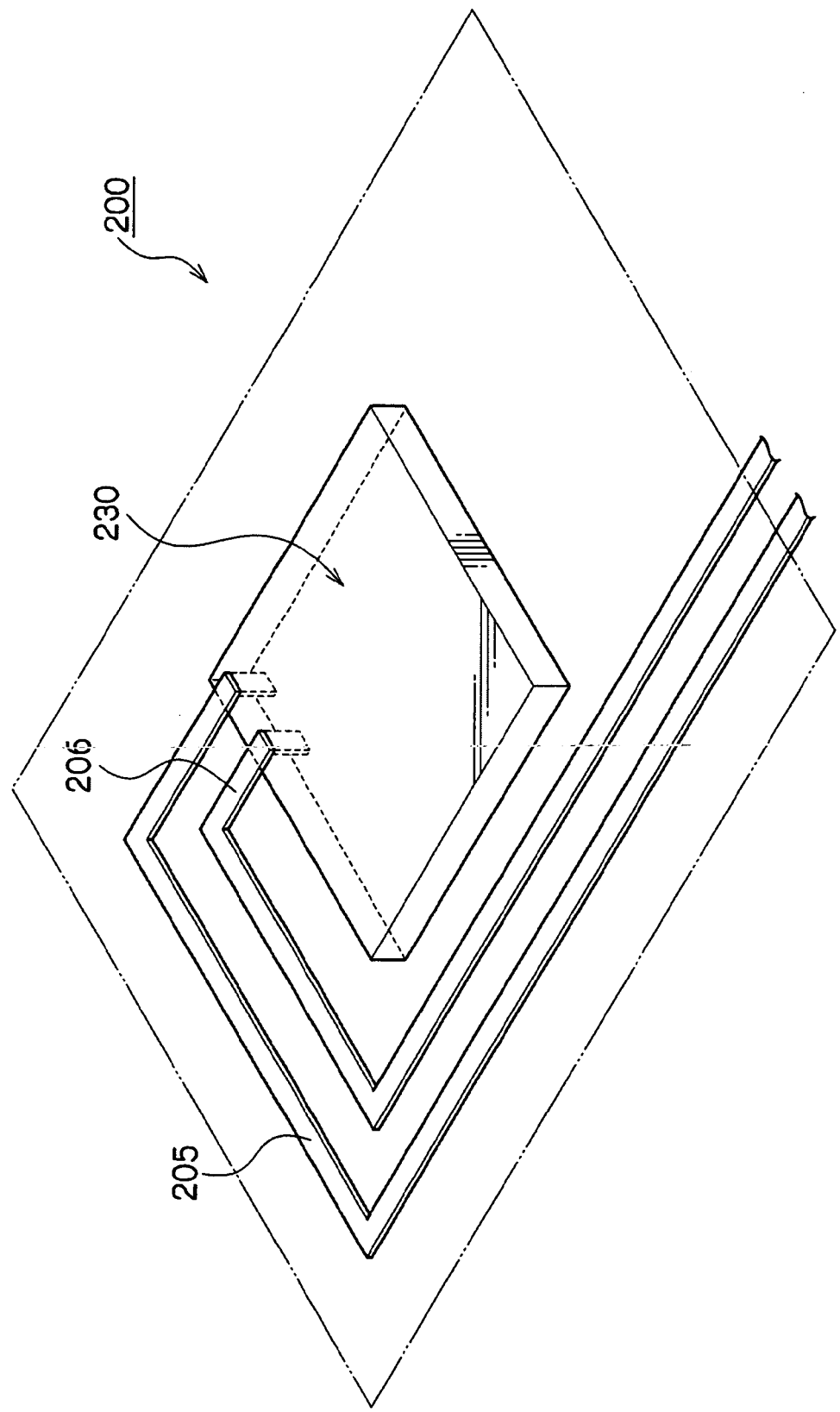
FIG. 4 is a schematic perspective view of an infrared detector in a second exemplary embodiment of the invention.

As an infrared detector in the second exemplary embodiment of the invention is an exemplary embodiment where, as shown in FIG. 4, when a beam is extracted from an infrared receiver 230, the beam is extracted from a position set higher by a strain amount.

Usually, when external impulse is applied, as shown in FIG. 3, a bent portion 140 is most bendable. However, an infrared detector 200 shown in FIG. 4, also to generation of bending due to the self-weight of other than the bent portion or the stress, is preferred in a point that the bent portion does not come into contact with a silicon substrate.

Fabricating Method of Infrared Detector in First Exemplary Embodiment of the Invention A fabricating method of an infrared detector in a first exemplary embodiment of the invention includes a step of forming a first polysilicon layer having a step on a silicon substrate, a step of forming an insulating film on the first polysilicon layer, a step of forming a second polysilicon layer on the insulating film, a step of patterning the second polysilicon layer to form a temperature sensor, a step of forming a beam having at least two bent portions and a step of anisotropically etching the polysilicon layer provided with the step and the silicon substrate.

An example of the fabricating method is shown in FIGS. 5 through 10B. FIGS. 5 through 7, FIG. 8A, FIG. 9A and FIG. 10A are sectional diagrams of steps in a C-C' cross section of FIG. 1 and FIG. 8B, FIG. 9B and FIG. 10B are diagrams of steps in an A-A' cross section of FIG. 1.

—Step for Forming First Polysilicon Layer Having Step on Silicon Substrate—

Figure 5:
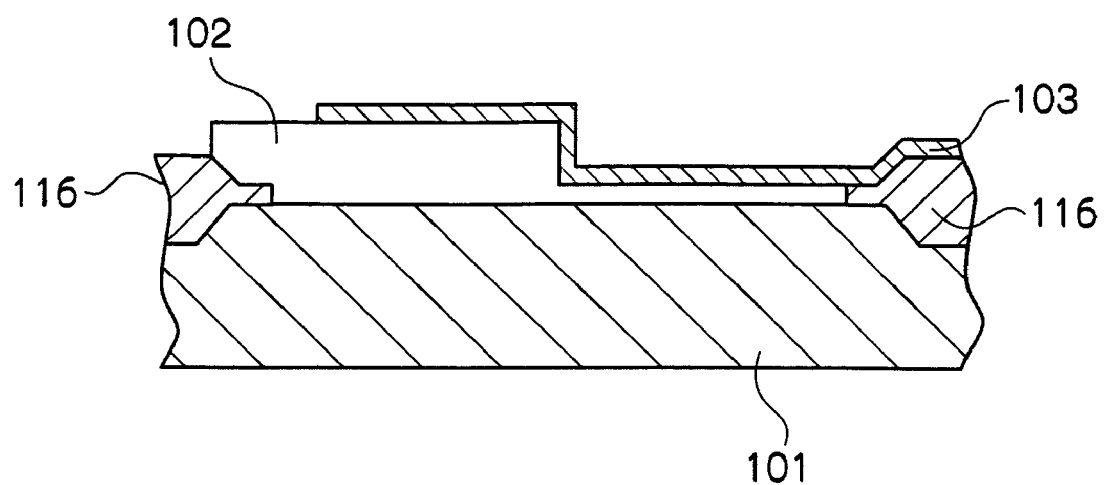
FIG. 5 is a sectional view at C-C' in FIG. 1 illustrating a step of fabricating an infrared detector in a first exemplary embodiment of the invention.

First, as shown in FIG. 5, on a silicon substrate 101, on which silicon oxide is formed by LOCOS (local oxidation of silicon), a polysilicon layer 102 is formed by means of a CVD (chemical vapor deposition) method. A plane orientation of a surface of the silicon substrate 101 is (100). The first polysilicon layer 102 is formed, assuming a strain amount, so as to have a film thickness of 2 μm.

Next, except at a position where the strain is generated most, by use of known lithography and dry etching, the first polysilicon layer 102 is removed to form a step. However, at the position where the removal is carried out, the polysilicon layer 102 is not completely removed, and remain, for example, about 300 nm of thickness us left to be used as a scarifying layer during forming of a void 122 of the silicon substrate 101 described below.

—Step of Forming Insulating Film on First Polysilicon Layer—

On the first polysilicon layer 102 having a step as mentioned above, a silicon nitride film (SiN) 103, which is an insulating film, is deposited by means of a CVD method. For instance, a thickness of the silicon nitride 103 is set substantially in the range of 100 to 300 nm.

—Step of Forming Second Polysilicon on Insulating Film—

Figure 6:
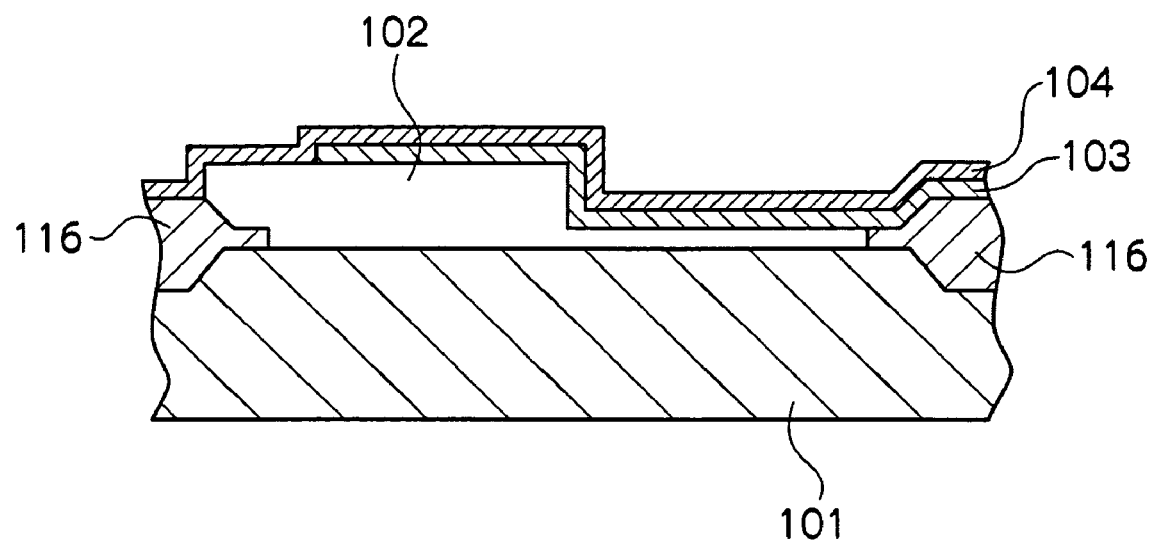
FIG. 6 is a sectional view at C-C' in FIG. 1 illustrating a step of fabricating an infrared detector in a first exemplary embodiment of the invention.

In a step shown in FIG. 6, on a silicon nitride film 103, a second polysilicon layer 104 is deposited. Though not shown in the drawing, phosphorus (P) or arsenic (As) is ion implanted in the second polysilicon layer 104 to form an N-type polysilicon layer. Furthermore, in a polysilicon layer 104 where the N-type polysilicon layer is not formed, boron (B) is ion implanted to form a P-type polysilicon layer.

—Step of Patterning Second Polysilicon to Form Temperature Sensor—

Figure 7:
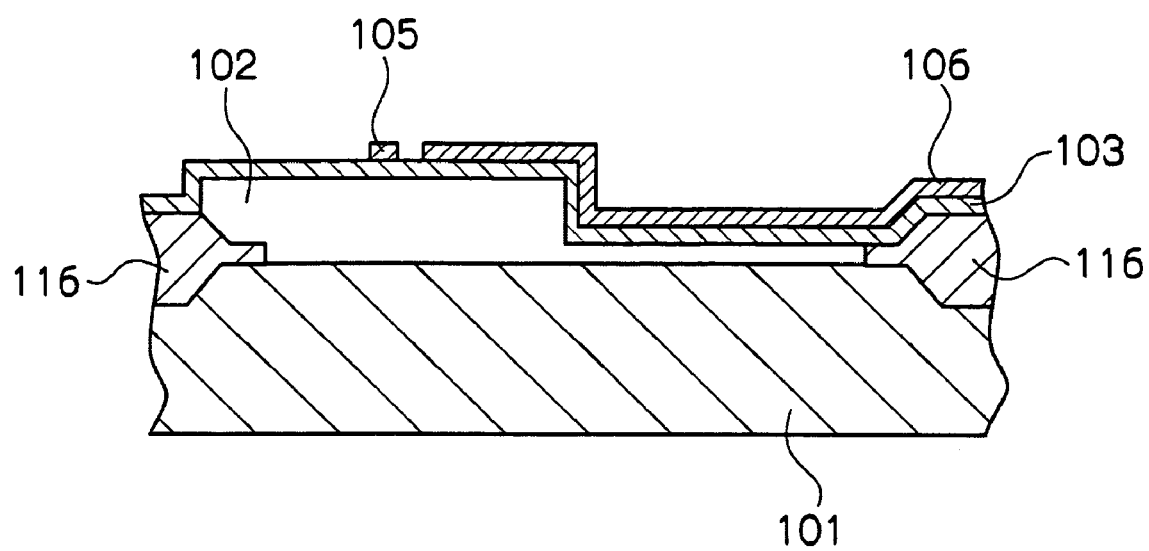
FIG. 7 is a sectional view at C-C' in FIG. 1 illustrating a step of fabricating an infrared detector in a first exemplary embodiment of the invention.

In a step shown in FIG. 7, by use of known lithography and dry etching, the ion-implanted polysilicon layer 104 is patterned to form an N-type polysilicon layer 105 and a P-type polysilicon layer 106 having at least two bent portions. In a step shown in FIG. 8, an interlayer insulating film such as a silicon oxide film 107 is formed. In FIG. 8A, a step is formed at the bent portion. However, in FIG. 8B that shows a cross section of a position where there is no risk of contact with the silicon substrate 101 due to the beam strain, a step is not formed. As to positions other than positions that come into contact with an output terminal and an infrared receiver, a step may be provided to the polysilicon layer at a position distanced from the silicon substrate 101, as described in the preferable exemplary embodiment.

—Step of Forming Beam Having at Least Two Bent Portions—

Figure 9A:
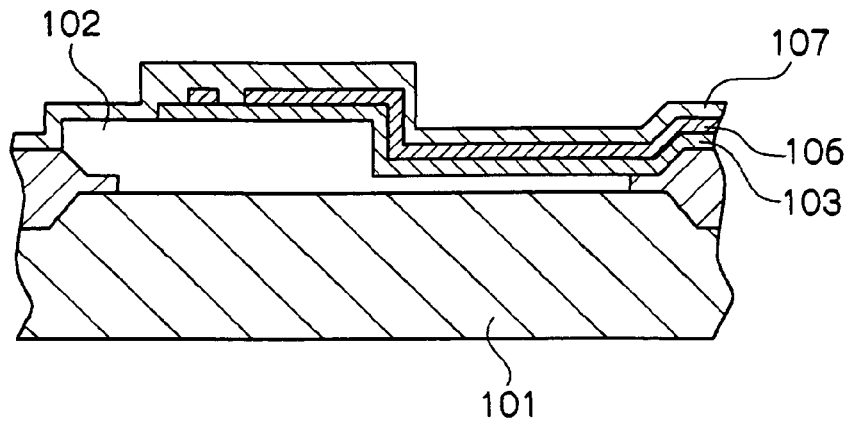
FIG. 9A is a sectional view at C-C' in FIG. 1 illustrating a step of fabricating an infrared detector in a first exemplary embodiment of the invention.
Figure 9B:
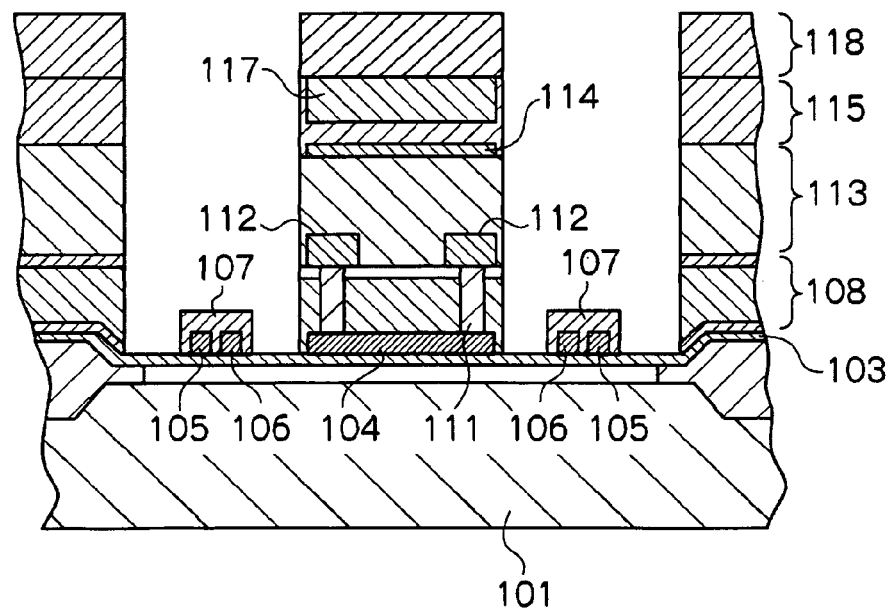
FIG. 9B is a sectional view at A-A' in FIG. 1 illustrating a step of fabricating an infrared detector in a first exemplary embodiment of the invention.

In a step shown in FIG. 9B, an interlayer insulating film such as a silicon oxide film 108 is further formed. Thereafter, at a predetermined position of the infrared receiver 130, a contact hole is formed. In the contact hole, a metallic film having a W/TiN/Ti structure, i.e., W, Tin and Ti are formed in this order from the top, is formed, followed by etching back to remove the metallic film other than in the contact hole. For instance, a W film is deposited by means of a CVD method to a thickness of 800 nm, and a TiN/Ti laminated film is formed by use of a sputtering method to respective thicknesses of 50 nm/30 nm. By the etching back, a contact plug 111 is formed. Then, after a wiring 112 is formed so as to connect with the contact plug 111, an insulating film such as a silicon oxide film 113 is further deposited over an entire surface. Next, an amorphous silicon film 114 is deposited by use of a sputtering method to a thickness of, for instance, 100 nm. After the amorphous silicon film 114 is patterned at an arbitrary position by use of the known lithography and dry etching, an interlayer insulating film such as a silicon oxide film 115 is deposited, a through-hole (not shown) is formed, and by etching back, a through-hole plug (not shown) made of a W/TiN laminated layer structure is formed. A wiring 117 that is electrically connected with the through-hole plug (not shown) is formed. Furthermore, a silicon oxide film 118 is formed over an entire surface. Thereafter, so as to let remain the silicon oxide film 107 that covers the N-type polysilicon layer 105 and P-type polysilicon layer 106, silicon oxide films 108, 113, 115 and 118 are subjected to known lithography and etching to form a slit. Subsequently, the known lithography is applied once more to etch the silicon oxide film 107 of the respective side portions up to above the silicon nitride film 103 that works as an etching stop layer so that the N-type polysilicon layer 105 and P-type polysilicon layer 106 may be covered with the silicon oxide film 107.

—Step of Anisotropic Etching of Polysilicon Layer Provided with Step and the Silicon Substrate—

Figure 10A:
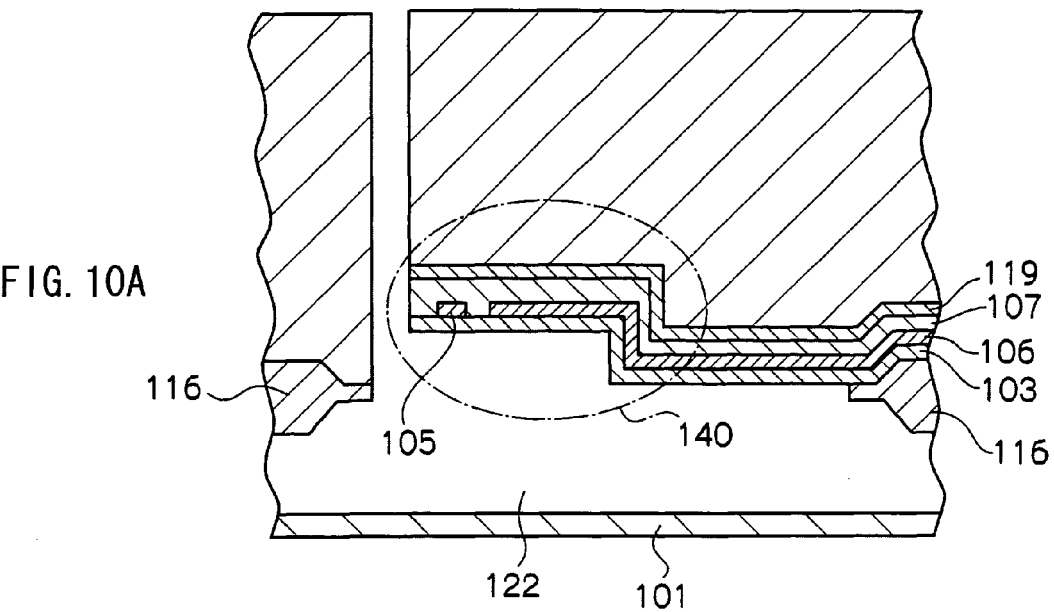
FIG. 10A is a sectional view at C-C' in FIG. 1 illustrating a step of fabricating an infrared detector in a first exemplary embodiment of the invention.
Figure 10B:
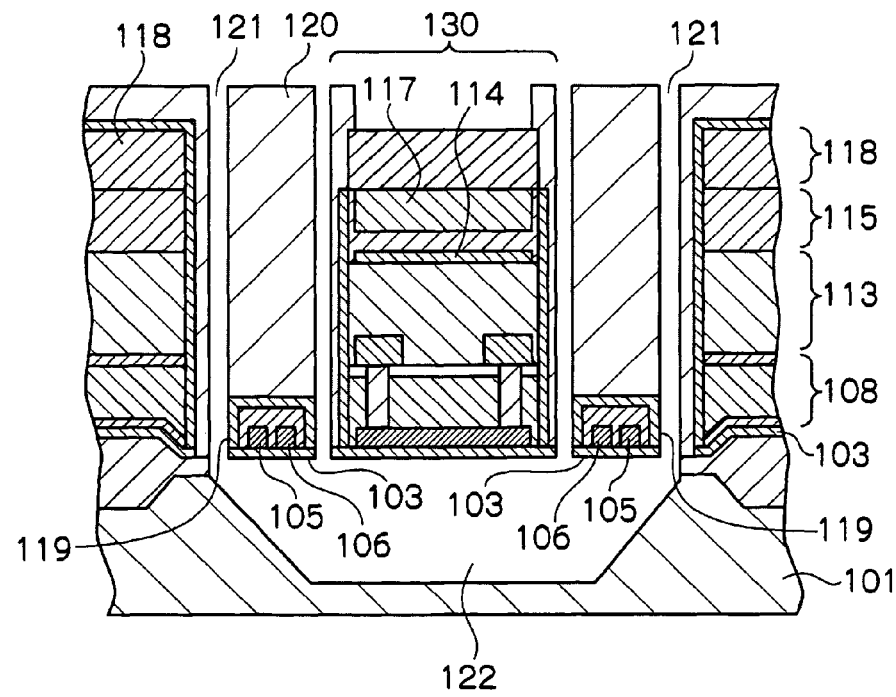
FIG. 10B is a sectional view at A-A' in FIG. 1 illustrating a step of fabricating an infrared detector in a first exemplary embodiment of the invention.

In a step shown in FIG. 10B, a silicon nitride film 119 is deposited by means of the CVD method so as to surround the N-type polysilicon layer 105 and P-type polysilicon layer 106 with silicon nitride films 103 and 119. Thereafter, an insulating film made of a phosphorus-doped silicon oxide film 120 for applying lifting-off later is formed. Lithography and etching are applied to an aperture of the infrared receiver 130 and, in order to form a void 122 on a silicon substrate 101, an etching slit 121 is formed. With an anisotropic etchant such as hydrazine, a polysilicon layer 102 as a scarificing layer and a silicon substrate 101 are wet etched. Herein, the wet etching is used to form a void 122. However, dry etching may be used to form a void 122. For instance, when the wet etching is used to anisotropically etch the silicon substrate, an etching speed of a (111) plane is slower than that of a (100) plane. Accordingly, when a plane orientation of a substrate is a (100) plane, a sidewall is formed at a constant angle from a surface of the substrate.

Finally, a concave-shaped void 122 is formed on the substrate. At that time, a position shaped in convex in cross section of the polysilicon layer 102 as well is simultaneously removed to form a beam portion having a step (bent portion 140).

Fabricating Method of Infrared Detector in Second Exemplary Embodiment of the Invention In a fabricating method of an infrared detector in a second exemplary embodiment of the invention, a method similar to the first exemplary embodiment may be used to produce except that, in a step of forming a first polysilicon layer having a step on the silicon substrate, excluding a position where a beam is formed (so that a step such as shown in FIG. 5 may not be formed), by means of known lithography and dry etching, a first polysilicon layer 102 is removed.

Third Exemplary Embodiment

FIG. 11A is a schematic top view of a conventional infrared detector. FIG. 11B is a partial schematic top view of the conventional infrared detector. FIG. 11C is a partial schematic top view of an infrared detector of a third exemplary embodiment of the invention, and FIG. 11D is a partial schematic top view of a modified example of an infrared detector in a third exemplary embodiment of the invention.

The infrared detector in the third exemplary embodiment of the invention is characterized in that, in FIG. 11A, in a bent portion 740 where a beam is most bendable, a convex shape in a top view such as shown in FIG. 11C is formed. By thus characterizing, in comparison with a shape of FIG. 11B, when a beam is bent, a direction of external stress is altered to enable to suppress a strain amount of the beam from increasing. The convex shape in a top view is preferably disposed to at least one of bent portions of the beam. Furthermore, as a more preferable exemplary embodiment, from the viewpoint of capable of more suppressing the strain amount from increasing, an exemplary embodiment where over an entire beam a convex portion in a top view is disposed is cited.

The convex shapes in a top view in the invention may be disposed so that, as shown in FIG. 11C, convex portions may face each other, or, as shown in FIG. 11D, the convex portions may direct in a same direction. Furthermore, the convex shapes in a top view may be disposed densely in the neighborhood of the bent portion large in the strain amount.

Still furthermore, a distance S1 between the N-type polysilicon layer 305 and P-type polysilicon layer 306, a height S2 of the convex portion, and a distance S3 between the convex portions may be appropriately controlled depending on the strain amount of the beam.

Figure 12:
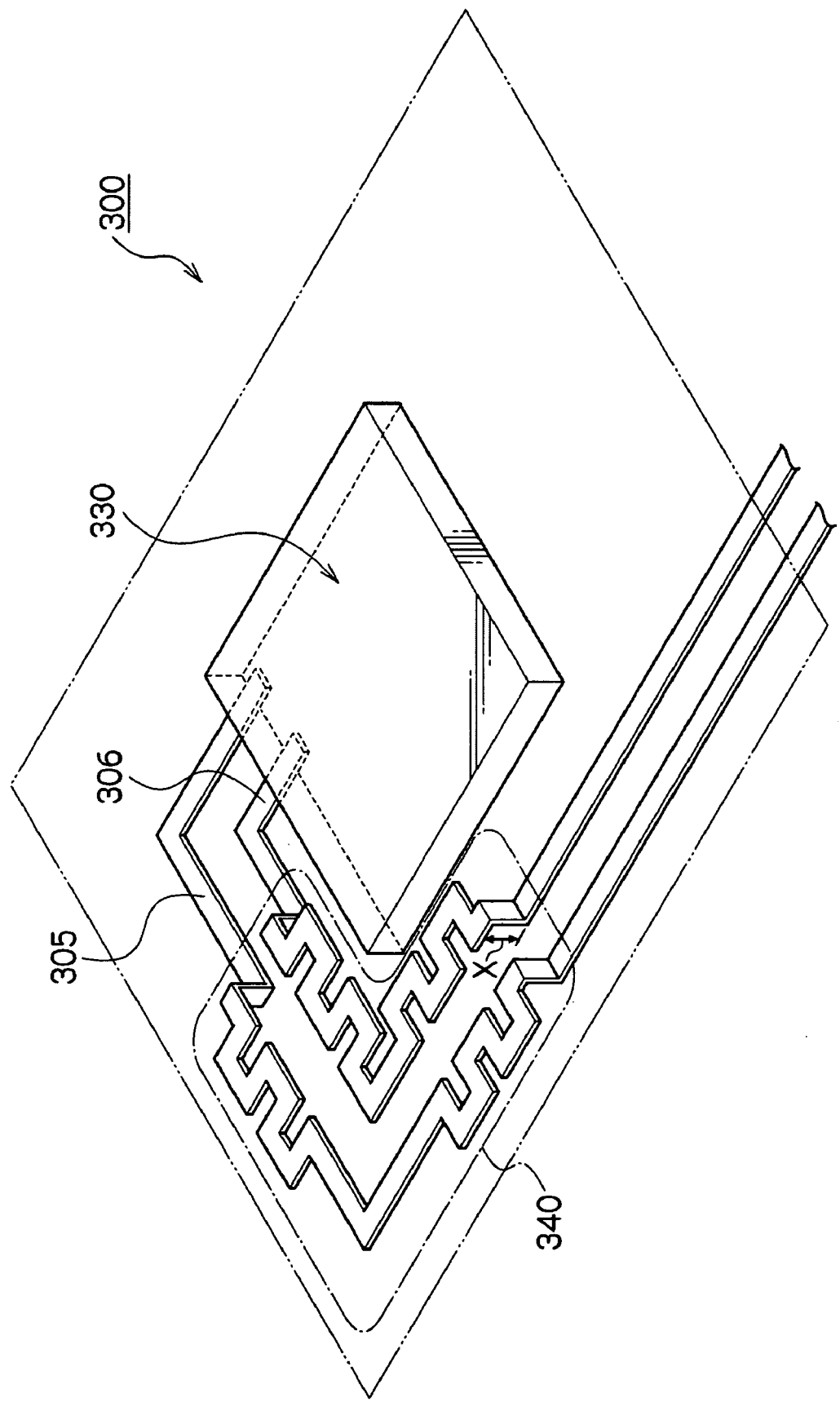
FIG. 12 is a schematic perspective view of an infrared detector in a third exemplary embodiment of the invention.

FIG. 12 is a schematic perspective view of an infrared detector in a third exemplary embodiment of the invention. That is, a schematic perspective view of an infrared detector where, in the infrared detector in the first exemplary embodiment of the invention shown in FIG. 3, the convex portion in a top view shown in FIG. 11C is adopted, is shown. Like this, when the convex portion in a top view is disposed to a bent portion where the beam is most bendable, even when the beam is bent, the beam is inhibited from coming into contact with the silicon substrate.

Fourth Exemplary Embodiment

FIG. 13 is a schematic perspective view of an infrared detector in a fourth exemplary embodiment of the invention. That is, it is a schematic perspective view of an infrared detector where, in the infrared detector in the second exemplary embodiment shown in FIG. 4, a convex portion in a top view of FIG. 11C is adopted. As shown in FIG. 13, an exemplary embodiment where, when a beam is extracted from an infrared receiver 430, the beam is extracted from a position elevated by a strain amount and a convex portion in a top view is further disposed is cited.

In the fourth exemplary embodiment, by disposing a convex portion, in addition to advantages of the infrared detector in the second exemplary embodiment, the strain amount of the beam per se may be suppressed.

Fifth Exemplary Embodiment

Figure 16A:
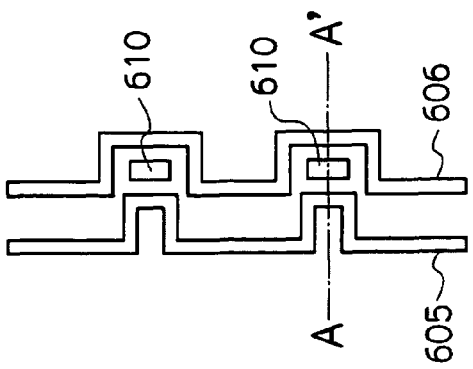
FIG. 16A is a partial schematic top view of a modified example of an infrared detector in a fifth exemplary embodiment of the invention.
Figure 16B:
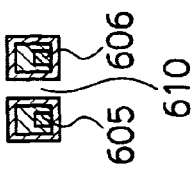
FIG. 16B is an A-A' sectional view of FIG. 16A.
Figure 15A:
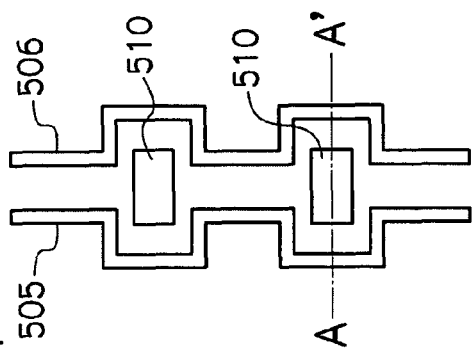
FIG. 15A is a partial schematic top view of an infrared detector in a fifth exemplary embodiment of the invention.
Figure 15B:
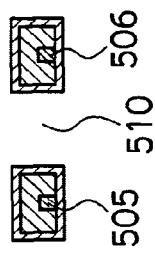
FIG. 15B is an A-A' sectional view of FIG. 15A.
Figure 14A:
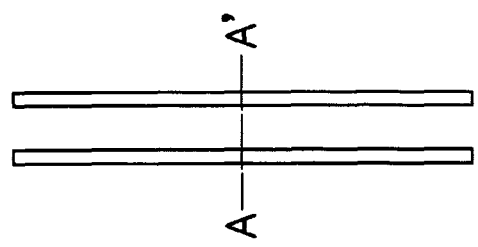
FIG. 14A is a partial schematic top view of a conventional infrared detector.
Figure 14B:
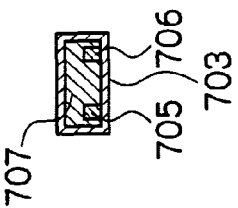
FIG. 14B is a schematic view of an A-A' cross section of FIG. 14A.
Figure 17A:
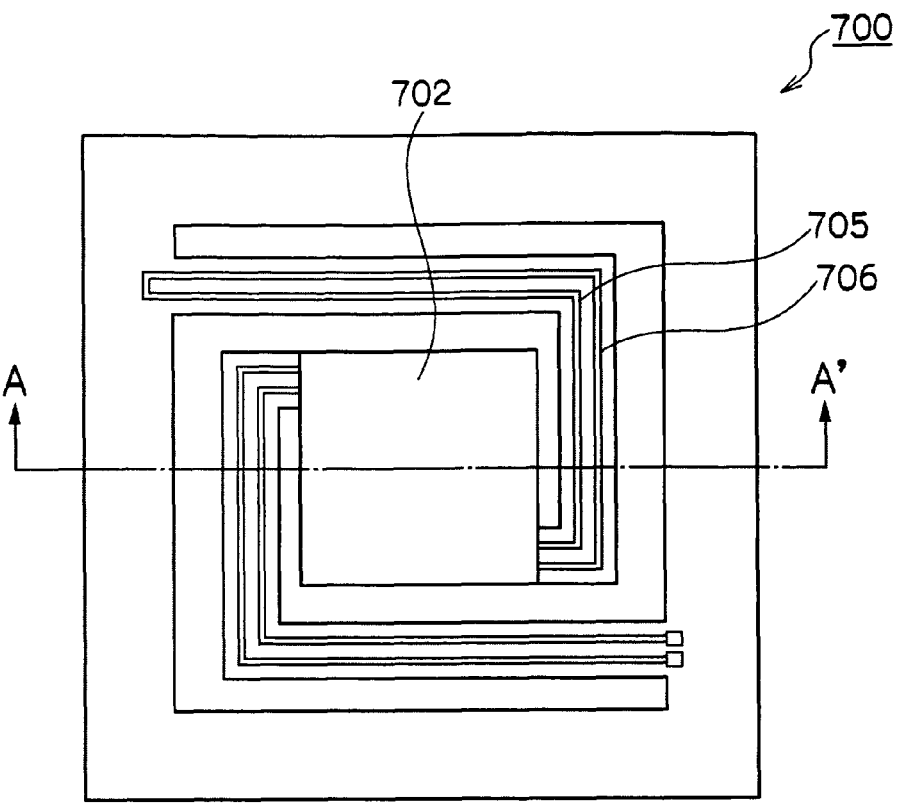
FIG. 17A is a top view in a conventional infrared detector.
Figure 17B:
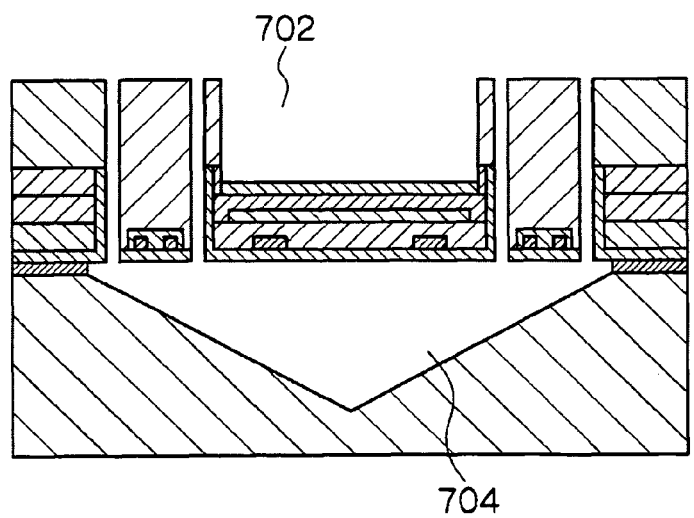
FIG. 17B is a sectional view in a conventional infrared detector.

FIG. 14A is a partial schematic top view of a conventional infrared detector, FIG. 14B being a schematic A-A' sectional view of FIG. 14A, FIG. 15A being a partial schematic top view of an infrared detector in a fifth exemplary embodiment of the invention, FIG. 15B being an A-A' sectional view of FIG. 15A, FIG. 16A being a partial schematic top view of a modified example of an infrared detector in the fifth exemplary embodiment of the invention, and FIG. 16B being an A-A' sectional view of FIG. 16A.

When FIG. 15A and FIG. 16A are compared, between the respective polysilicon layers of FIG. 11C or FIG. 11D, an aperture 510 or 610 is disposed. Owing to the aperture 510 or 610, the internal stress is alleviated and thereby the strain amount of the beam is further reduced. The apertures 510 and 610 are disposed between the convex portions in a top view in FIGS. 15B and 16B without restricting to a particular position as far as it may effectively alleviate the internal stress.

Furthermore, an embodiment where the fifth exemplary embodiment is applied to the second exemplary embodiment may be used. In the exemplary embodiment, in addition to advantages of the second exemplary embodiment, even when the external stress is applied so as to bend more than expectation, the strain amount of the beam is suppressed from increasing; accordingly, the beam does not come into contact with the silicon substrate.

Fabricating Method of Infrared Detector in the Third Exemplary Embodiment of the Invention In a fabricating method of an infrared detector in the third exemplary embodiment of the invention, in the fabricating method of the infrared detector in the first exemplary embodiment, a first polysilicon layer is formed. Furthermore, in the step of forming a temperature sensor, a patterning step is applied so as to form convex portions in a top view to form N-type and P-type polysilicon layers 305 and 306, or 405 and 406. Except the two steps, similarly to a fabricating method of an infrared detector in the first exemplary embodiment, an infrared detector may be fabricated.

Like this, the infrared detector in the first exemplary embodiment and the infrared detector in the second exemplary embodiment may be fabricated with the same number of steps.

Fabricating Method of Infrared Detector in the Fourth Exemplary Embodiment of the Invention In a fabricating method of an infrared detector in the fourth exemplary embodiment of the invention, in the fabricating method of the infrared detector in the second exemplary embodiment of the invention, except that a patterning step is applied so as to form a convex portion in a top view, according to a method similar to the method of the first exemplary embodiment, the infrared detector is fabricated.

Fabricating Method of Infrared Detector in the Fifth Exemplary Embodiment of the Invention In a fabricating method of the infrared detector of the fifth exemplary embodiment of the invention, in a step where an infrared detector in the third exemplary embodiment of the invention is anisotropically etched, at a predetermined position between the N-type and P-type polysilicon layers, an etching slit is formed and an aperture is simultaneously formed.

What is claimed is:

1. An infrared detector comprising:
   a silicon substrate provided with a concave portion therein, the concave portion defining an opening;
   an infrared receiver having a polysilicon layer formed above the opening of the concave portion; and
   a beam that supports the infrared receiver above the opening of the concave portion, and extends from the infrared receiver along a side of the infrared receiver to connect with the silicon substrate, the beam having at least two bent portions,
   wherein the beam is extended from the infrared receiver at a position higher than the polysilicon layer by a maximum strain amount, so as to maintain the bent portions of the beam at a position above the opening of the concave portion when the beam is strained by the maximum strain amount.

2. The infrared detector of claim 1, wherein at least one of the bent portions is provided with a convex shape in a top view.

3. The infrared detector of claim 2, wherein at least one of the bent portions is provided with an aperture.

4. The infrared detector of claim 1, wherein a surface of the silicon substrate is a (100) plane.

5. The infrared detector of claim 1, wherein the polysilicon layer has a film thickness determined based on an assumed strain amount to occur at a region at which the polysilicon layer is formed.

6. The infrared detector of claim 2, wherein the convex portion in a top view is disposed over an entirety of the beam.

7. The infrared detector of claim 2, wherein more than one convex portion in a top view are disposed such that convex portions may face each other.

8. The infrared detector of claim 2, wherein more than one convex portion in a top view are disposed such that the convex portions direct in a same direction.

9. The infrared detector of claim 2, wherein the convex portion in a top view is disposed densely in the neighborhood of the bent portions.

10. The infrared detector of claim 1, wherein the infrared receiver has a plurality of polysilicon layers, and an aperture is disposed between the polysilicon layers.

11. The infrared detector of claim 3, wherein the infrared receiver has a plurality of polysilicon layers, and another aperture is disposed between the polysilicon layers.

12. The infrared detector of claim 1, wherein
    the concave portion comprises sidewalls;
    the sidewalls define the opening at a top portion thereof and a bottom at a bottom portion thereof; and
    the opening is larger than the bottom.

13. The infrared detector of claim 12, wherein the sidewalls are sloped inwardly from the top portion to the bottom portion.

* * * * *